United States Patent [19]

Crawford et al.

[11] Patent Number: 5,201,043
[45] Date of Patent: Apr. 6, 1993

[54] SYSTEM USING BOTH A SUPERVISOR LEVEL CONTROL BIT AND A USER LEVEL CONTROL BIT TO ENABLE/DISABLE MEMORY REFERENCE ALIGNMENT CHECKING

[75] Inventors: John H. Crawford, Santa Clara; Ashish B. Dixit, Fremont, both of Calif.

[73] Assignee: Intel Corporation, Santa Clara, Calif.

[21] Appl. No.: 897,596

[22] Filed: Jun. 10, 1992

Related U.S. Application Data

[63] Continuation of Ser. No. 334,074, Apr. 5, 1989, abandoned.

[51] Int. Cl.$^5$ .............................................. G06F 11/30
[52] U.S. Cl. ................................... 395/575; 395/400; 395/425; 364/DIG. 1; 364/265.3; 364/259.7; 364/944.92; 364/945.5; 364/945.7; 364/DIG. 2; 364/947.4
[58] Field of Search .............. 395/425, 400, 575; 371/19, 17

[56] References Cited

U.S. PATENT DOCUMENTS

| | | | |
|---|---|---|---|
| 3,573,855 | 4/1971 | Cragon et al. | 340/172.5 |
| 3,828,327 | 8/1974 | Berglund et al. | 340/172.5 |
| 3,916,388 | 10/1975 | Shimp et al. | 340/172.5 |
| 3,940,745 | 2/1976 | Sajeva | 340/172.5 |
| 4,037,215 | 7/1977 | Birney et al. | 364/200 |
| 4,121,286 | 10/1978 | Venton et al. | 364/200 |
| 4,507,731 | 3/1985 | Morrison | 364/200 |
| 4,545,016 | 10/1985 | Berger | 364/200 |
| 4,667,305 | 5/1987 | Dill et al. | 364/900 |
| 4,814,976 | 3/1989 | Hansen et al. | 364/200 |
| 4,933,847 | 6/1990 | Chau et al. | 364/200 |
| 4,961,162 | 10/1990 | Nguyenphu et al. | 364/736 |
| 5,023,773 | 6/1991 | Baum et al. | 395/575 |
| 5,051,894 | 9/1991 | Phillips et al. | 364/200 |

*Primary Examiner*—Thomas C. Lee
*Assistant Examiner*—Richard Lee Ellis
*Attorney, Agent, or Firm*—Blakely, Sokoloff, Taylor & Zafman

[57] ABSTRACT

A microprocessor which includes means for detecting misaligned data reference is described. The detecting means is selectable such that when it is enabled and reference is made to a misaligned data object, a fault is produced which interrupts the currently executing program. The detecting means comprises two mode bits stored within the microprocessor. The first mode bit provides control of the fault at the least privileged level of execution (i.e., the applications level) while the second mode bit provides control of the fault at the most privileged level (i.e., the operating system level). Both mode bits must be set to "1" in order for the detecting means to be enabled. The use of two separate mode bits for optionally enabling alignment checking provides optimum programming flexibility.

10 Claims, 3 Drawing Sheets

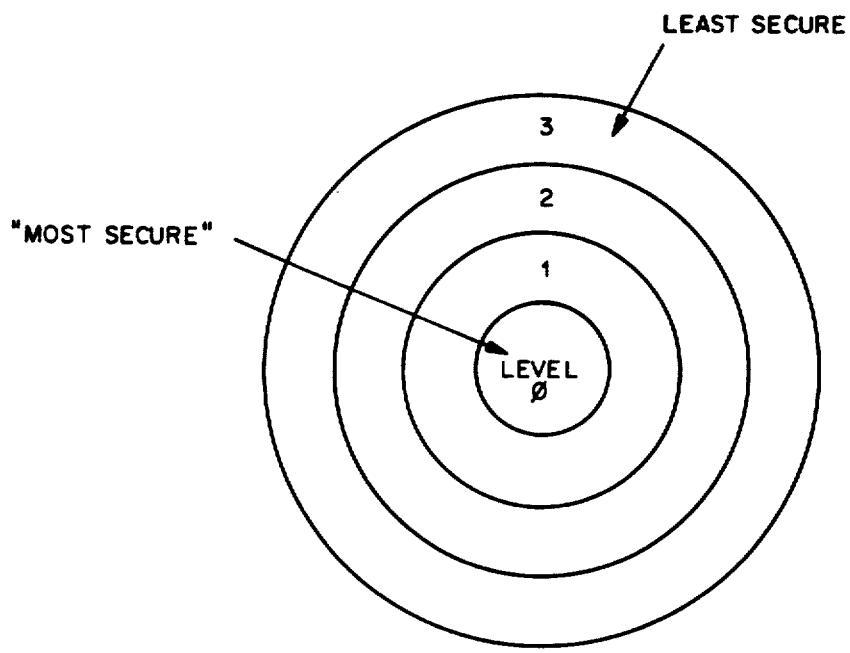

FIG_3
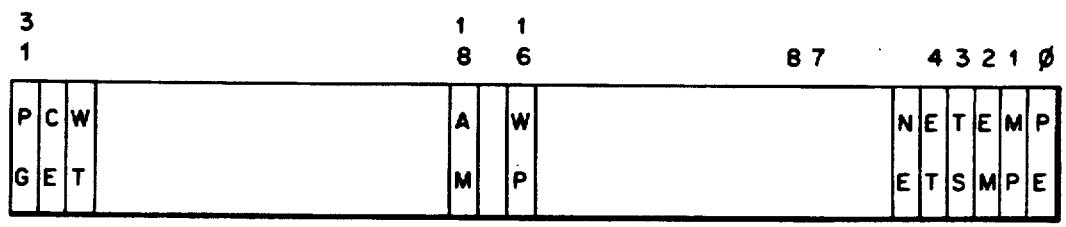
FIG_4
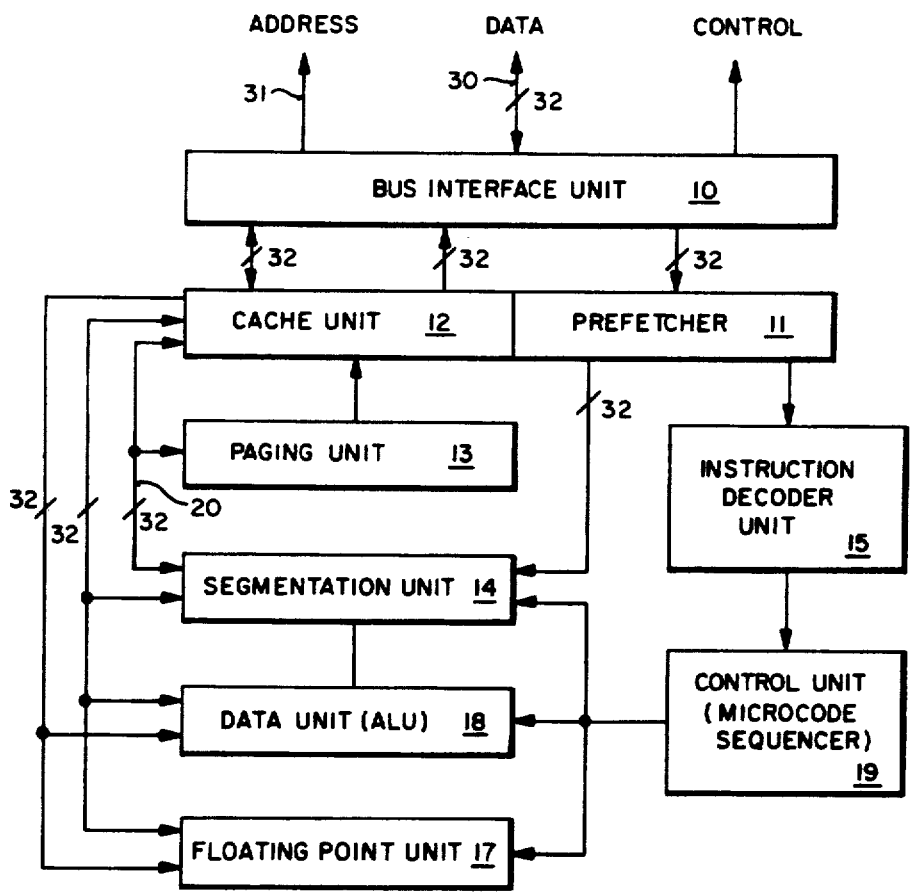

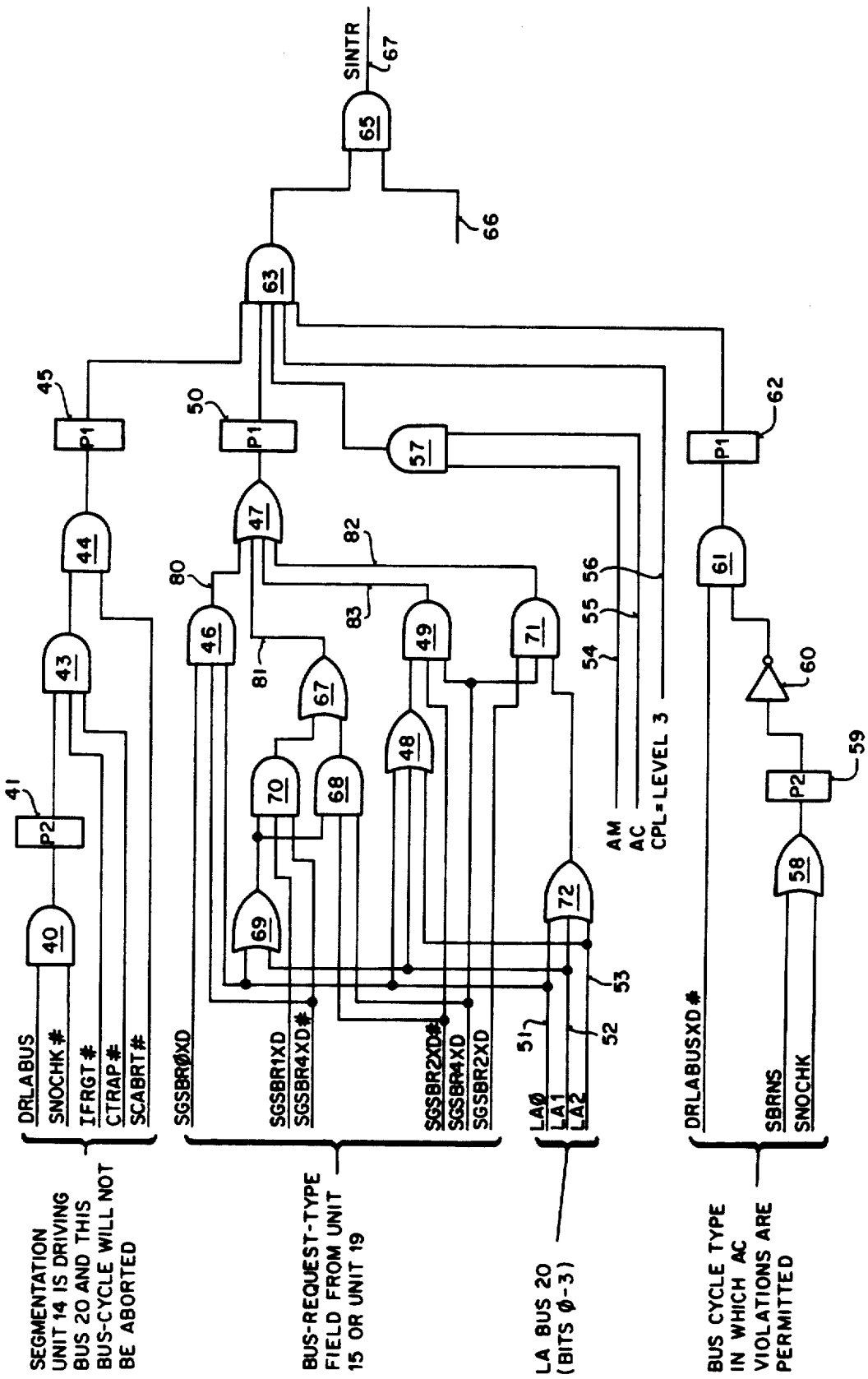

SYSTEM USING BOTH A SUPERVISOR LEVEL CONTROL BIT AND A USER LEVEL CONTROL BIT TO ENABLE/DISABLE MEMORY REFERENCE ALIGNMENT CHECKING

This is a continuation of application Ser. No. 07,334,074, filed Apr. 5, 1989 now abandoned.

FIELD OF THE INVENTION

The invention relates to the field of semiconductor microprocessors.

BACKGROUND OF THE INVENTION

The present invention covers a scheme for having alignment checks controlled by "mode bits" within a microprocessor. Using this concept, the programmer is allowed to select whether a fault will be generated if a memory reference is to a misaligned address. The currently preferred embodiment of the present invention if incorporated in the architecture of the Intel 80486 microprocessor, also known as the i1486 TM processor. The i486 TM microprocessor is an improvement over Intel's 80386 microprocessor, also referred to as the 386 TM processor. (Intel, 80386, 386, 80486, and 486 are trademarks of Intel Corporation).

The 80486 microprocessor is a 32-bit, high-performance member of the x86 family of processors. It is object code compatible with the 80386 processor. As a result it can run code developed for the previous members of the family. Generally, it is a reimplementation of the 80386 architecture with the aim of providing at least a 2.5 times performance improvement as measured by the average number of clocks per instruction. The present invention represents one such feature of the 80486 microprocessor which contributes to this performance improvement.

As mentioned above, this invention adds the capability to a microprocessor of being able to select whether a fault is generated if a memory reference in a program is to be misaligned address. Conventionally, an address of a datum is considered aligned if it is a multiple of its length. A one-byte datum is always aligned. A two-byte datum is aligned is its address is a multiple of two. A four-byte datum is aligned if its address is a multiple of four, and so on. Data, therefore, is generally aligned when the address is a multiple of its size.

The significance of aligned memory references becomes more evident when one considers the internal memory architecture of a microprocessor. In most computers the memory is organized in such a way that the data size is equal to the memory width. If you have a memory organized by 32-bits, this means that you can access a 32-bit item that has an address which is a multiple of four within one memory clock cycle. (A 32-bit word is frequently referred to as a doubleword or dword—a dword being comprised of four separate bytes, e.g., 0, 1, 2 and 3). Both the 80386 and the 80486 CPUs permit referencing to data at arbitrary addresses. If the reference is not aligned then the microprocessor suffers a performance penalty which is manifested by additional memory cycles needed to access or reference the data.

Consider a memory reference to a 32-bit dword beginning at address 3. In past approaches, the processor would reference 2 dwords; first the dword beginning at address 0 to extract byte 3, then the dword beginning at address 4 to extract the remaining bytes 4, 5 and 6. After accessing the required bytes the processor would then somehow piece them together to reconstruct the data item or memory reference. Thus, prior approaches suffer at least two penalties: (1) the requirement of at least two additional memory cycles, and (2) a reconstructing or "piecing together" of the data item in a new storage location.

To avoid this drawback, several alternative approaches have been attempted. For instance, in the 80386 alignment checks can be performed by the insertion of an in-line code proceeding every memory reference. This code generates an address into a register and then masks out the lower bits of the register. The masking operation is implemented by taking the same register components and adding an aligning displacement. Basically, a series of three separate instructions must be executed proceeding every memory reference using this approach. Since half of the instructions in a typical program reference memory in some way, this represents an unacceptable overhead—degrading performance as much as 20 to 30 percent.

Several machines, the most notably the new RISC processors, require all memory references to be aligned. These machines always fault on references to misaligned data. However, the faults are not selectable, so that faults are invariably generated. This presents a problem since many non-artificial intelligence environments (especially COBOL) benefit from the ability to reference misaligned data. Another category of machines permits misaligned references, however, with the performance penalty described above. These machines include the Intel 80386, Digital's VAX and the IBM 370. Consequently, a new method of providing optional misaligned address faults, which does not suffer from the performance penalties described above, is what is needed in the field.

As will be seen, the present invention provides a means for alignment checking which is selectable by the user and requires no additional instructions. Moreover, the invention supports two levels of masking for the alignment checking procedure; one at the application level and the other at the operating system level. With the ability to mask the trap or the fault itself, this invention offers the user two opportunities to control alignment checking.

Accordingly, the object of the present invention is to provide a means for detecting inadvertent misalignment of data. For purposes of program debugging, aligning data can increase performance substantially.

Another object of the present invention is to provide a means for generating alignment faults in certain artificial intelligence (AI) programs which use lower order address bits to identify types of pointers, and then use small displacements to "adjust out" these tag bits to get an aligned address. The present invention provides pointer type checking without a substantial performance penalty. Experimental measurements indicate that the present invention realizes a thirty percent performance boost on average AI programs running on the 80386 microprocessor. Other studies have shown a twenty percent increase on other machines.

SUMMARY OF THE INVENTION

A microprocessor which includes a means for detecting misaligned data reference is described. The detecting means is selectable such that when the detecting means is enabled and reference is made to a misaligned data object, a fault is produced which interrupts execution of the current program. The detecting means is part of the segmentation unit of the presently described microprocessor. In the preferred embodiment, the microprocessor also has a protection mechanism for granting access to certain data objects at various levels of privilege.

The detecting means comprises two mode bits stored within the microprocessor. The first mode bit provides masking of the fault at the least privileged level of execution (i.e., the applications level) while the second mode bit provides masking of the fault at the most privileged level (i.e., the operating system level). Thus, access to the mode, or mask, bits is provided at two different levels. Both mode bits must be set to "1" in order for the detecting means to be enabled. The use of two separate mode bits for optionally enabling alignment checking provides optimum programming flexibility.

BRIEF DESCRIPTION OF THE DRAWINGS

The present invention will be understood more fully from the detailed description given below and from the accompanying drawings of the preferred embodiment of the invention, which, however, should not be taken to limit the invention to the specific embodiment but are for explanation and understanding only.

FIG. 1 illustrates the four privilege levels provided by the invented microprocessor. The most secure level is shown as level 0 and the least secure level is shown as level 3.

FIG. 2 illustrates the EFLAGS register located within the invented microprocessor. The EFLAGS register has an extra bit (the AC bit) defined in the upper 16-bits to support faults on access to misaligned data at privilege level 3.

FIG. 3 illustrates the machine status control register (CRO) which contains an alignment masking bit (AM) which controls whether the AC bit in EFLAGS can allow an alignment fault or not.

FIG. 4 is a general block diagram of the microprocessor of the present invention.

FIG. 5 is a diagram showing how alignment checking is logically implemented in the currently preferred embodiment of the present invention.

DETAILED DESCRIPTION

A microprocessor including a means for selecting whether a fault is to be generated whenever a misaligned memory reference is detected is described. In the following description, numerous specific details are set forth, such as specific bit lengths, register contents, logic diagrams, etc., in order to provide a thorough understanding of the present invention. It will be obvious, however, to one skilled in the art that these specific details need not be used to practice the present invention. In other instances, well-known structures and circuits, have not been shown in detail in order not to unnecessarily obscure the present invention.

Prior to discussing the detailed embodiment, it is beneficial to the understanding of the present invention to first consider several architectural features of the preferred microprocessor.

BASIC MICROPROCESSOR ARCHITECTURE

As the role of computers in our society becomes increasingly significant, more microprocessors are implementing a protected virtual address mode (protected mode). The protected mode incorporated into the preferred microprocessor allows multiple applications to run concurrently, but isolates them from one another so that failures in one application do not affect any other application. The central feature of a protection mechanism is the selector. Rather than directly accessing any part of the system, a program deals with a selector which grants access to a system object. Associated with each object is information about it, for example its location, size, restrictions on use, etc. In the preferred microprocessor only the operating system has access to the data referenced by the selector which is called a descriptor.

Descriptors describe a system object in detail. Memory segments are one kind of system object. Other system objects include tables that support the protection mechanism, special segments that store the processor state, etc. By examining the selector the hardware determines which descriptor is associated with the selector and with the object to which the descriptor points. One item that the descriptor indicates is the privilege level of the object. When a program requests access to an object with the selector either access is denied (if the request violates a rule of the protection mechanism control passes from the program to a designated routine in the operating system), access is permitted but not granted (e.g., if the object is not currently in memory, an operating system routine must swap the object into memory and return control to the program), or access is granted at the requested privilege level.

The preferred processor supports four levels of increasing privilege, numbered 3, 2, 1, and 0 as shown in FIG. 1. Privilege level 0 is the most privileged level. The privilege level of the selector in the code segment (CS) register identifies the precedence of the currently executing routine and it is called the current privilege level (CPL). For reliability reasons, only the most trustworthy code in the operating system runs at the most privileged level (CPL=0). Applications that might fail are run at the lowest level (CPL=3). Various privilege levels are shown as a series of concentric rings in FIG. 1. (The word privilege connotates rights or advantages not normally granted. In the 80486 microprocessor, procedures running at the innermost rings can access data objects in the outer rings, but outer-ring procedures cannot access inner-ring objects with greater privilege.)

As will be discussed in more detail later, the present invention allows masking of the alignment check feature at both the application level (e.g., CPL=3) and at the operating system level (e.g., CPL=0). This selectability of masking at two different privilege levels allows the present invention to be compatible with those machines which either always trap, or never trap, on a misaligned reference. By way of example, at the operating system level, the alignment check feature may be disabled at reset thereby rendering it compatible with the 80386 microprocessor.

In certain programming languages, such as C or Pascal, when the data type is declared at compile time, the selector is tagged with that data type forever. In other words, the data type does not change when the program is executing. However, in some AI languages such as LISP or Prolog added flexibility is included in run/-time type assignments. In these languages the data type can vary as the program executes. This allows the user to define a function that will operate on multiple types (e.g., $\sqrt{x}$, where x is either an integer, short real, long real, complex, etc.). Thus, depending on the data type at a particular point in the program, multiple functions can be performed.

In LISP or Prolog programs the pointer field indicates both the address and the type of the data. The item that identifies the data type is called the tag. The programmer uses the bottom two bits of a 32-bit pointer as the most significant tag bits. In cases in which the data type must be of a certain type or the operation is invalid, or in those cases in which the programmer expects the data type to be a certain type with overwhelming frequency, the user can generate a code that assumes the tag is a given value. This code cancels the lower tag bits. For example, if the tag has a value of 2, then the code would add a value of −2 to cancel out the tag bits. This offset or cancellation is also known as a displacement. If the displacement is correct, the memory item will be aligned and the data can be referenced without undergoing a fault or trap.

When executing AI programs using the present invention, memory references will be aligned as long as the displacement matches the tag. However, if the displacement does not match the tag the alignment checker of the present invention optionally generates a trap or fault. When this occurs, the current execution location (CS:EIP) and the contents of the flags register (EFLAGS) are saved on the stack and controls transfers to a software routine known as an interrupt handler. A specific interrupt number is associated with each fault condition. The instruction pointer saved on the stack after a fault occurs points to the instruction that caused the fault. Thus, the operating system can correct the condition and resume executing the instruction.

OVERALL BLOCK DIAGRAM OF THE MICROPROCESSOR

Referring to FIG. 4, the invented microprocessor incorporating the presently described alignment checking feature is shown in general block diagram form. The microprocessor includes a bus interface unit 10 which is coupled to a 32-bit external data bus 30 and additionally is coupled to an address bus 31 and several other control lines. Bus interface unit 10 deals with physical (hardware) addresses only, so operand addresses must first pass through segmentation unit 14 and paging unit 13. Also coupled to bus interface unit 10 are cache unit 12 and prefetcher 11. The prefetch unit continually asks the bus interface unit to fetch the contents of memory of the next instruction address. As soon as the prefetch unit receives the data, it places it in the queue and, if the queue is not full, requests another 32-bit piece of memory.

Cache unit 12 includes a data cache and controller which controls the accessing of the cache memory. Both the prefetcher 11 and cache unit 12 are coupled via a 32-bit bus to segmentation unit 14. Segmentation unit 14 translates segmented addresses into linear addresses.

Segmentation unit 14 is coupled to paging unit 13 and cache unit 12 through a 32-bit linear address bus 20, also called the "LA bus" (e.g., Linear Address). Paging unit 13 takes the linear addresses generated by segmentation unit 14 and converts them into physical addresses. If paging is disabled, the linear addresses of the segmentation unit become the physical addresses. When paging is enabled, the linear addresses of the microprocessor are divided into 4096-byte blocks called pages. Each page can be mapped into an entirely different address. For purposes of understanding the present invention, segmentation unit 14 may be assumed to be the same as that used in the commercially available Intel 80386 microprocessor. The segmentation and paging units for the Intel 80386 microprocessor are described in co-pending application, Ser. No. 744,389, filed Jun. 13, 1985, entitled "Memory Management For Microprocessor", which is assigned to the assignee of the present invention.

Within the microprocessor instructions are coupled to the instruction decoder unit 15. The decoder unit operates in a manner similar to that of the prefetch unit. It takes individual bytes from the prefetch queue and determines the number of bytes needed to complete the next instruction. The decoder unit operates with a control unit 19 in which microcode instructions are stored; controller 19 providing sequences of control signals for the microprocessor. The instruction decode unit 15 is shown coupled to control unit 19 while control unit 19 is shown coupled to segmentation unit 14, data unit 18 and floating point unit 17. Data unit 18 is an arithmetic logic unit (AIU) which performs ALU functions in a similar manner to those performed by the Intel 80386 processor.

The microprocessor also includes a floating point unit 17 for performing floating point computations. The precise configuration of floating point unit 17, as well as the other units of the microprocessor, is not critical to the understanding the present invention. Signal flow between the various units of the microprocessor will be discussed only insofar as needed to comprehend the present invention.

DISCUSSION OF THE PREFERRED EMBODIMENT

The selectable alignment checker of the present invention is externally visible to the programmer as two new state (or mode) bits. One bit is located in the EFLAGS register and is called the AC (alignment check) bit. The EFLAGS register holds status information about the current instruction stream (the EIP register contains the address of the currently executing instruction) as well as a number of fields relevant to different instructions. The other bit, called the AM (alignment masking) bit, is located in the control register CR0.

Referring now to FIG. 2, the details of the EFLAGS register is shown. (Note that flag bits 1, 3, 5, 15 and 19 through 31 are "undefined".) The AC bit is located at bit position 18. The AC bit enables the generation of faults if the memory reference is to a misaligned address. For example, this can be caused by a word access to an odd address, a dword access to an address that is not 0 MOD 4, or an 8-byte reference to an address that is not 0 MOD 8. Alignment faults are generated only at level 3, that is, the AC bit setting is ignored (implicitly 0) at levels 0, 1, and 2. References to the descriptor tables (for selector loads) are implicitly level 0 references, even if the instructions "causing" the descriptor table are executed at level 3. Aligned faults are reported in the preferred embodiment through interrupt bit 17, with an error code of 0. (Bit 17 is the virtual mode (VM) bit which indicates that the currently executing instruction stream is x86 code with set to 1.)

The following table lists the alignment required for microprocessor data types:

TABLE 1

ALIGNMENT REQUIREMENTS BY DATA TYPE

| DATA TYPE | ALIGNMENT |
| --- | --- |
| WORD | 2 |
| DWORD | 4 |
| SHORT REAL | 4 |
| LONG REAL | 8 |
| TEMPREAL | 8 |
| SELECTOR | 2 |
| 48-BIT SEGMENTED POINTER | 4 |
| 32-BIT FLAT POINTER | 4 |
| 32-BIT SEGMENTED POINTER | 2 |
| 48-BIT "PSEUDO-DESCRIPTOR" | 4 |
| FSTENV/FLDENV SAVE AREA | 4/2 (ON OPERAND SIZE) |
| FSAVE/FRSTOR SAVE AREA | 4/2 (ON OPERAND SIZE) |
| BIT STRING | 4 |

Because the alignment check feature must be separately enabled for each task, it has been included in the EFLAGS register since each task has its own "copy" of EFLAGS.

Referring now to FIG. 3, the control register CR0, containing the aligning mask control bit (AM), is shown. Control register CR0 is one of several control registers which regulate the paging and numeric co-processor operation of the microprocessor. As shown in FIG. 3, the alignment mask control bit is at bit position 18 of CR0. The AM bit controls whether the AC bit in EFLAGS can allow an alignment fault or not. AM—0 disables the check (e.g., 80386 microprocessor compatibility), while AM=1 enables it. The AM bit can only be accessed at privilege level 0; presumably only by the operating system. The operating system will set this bit to 1 to enable alignment faults only if the operating system includes the appropriate interrupt handler.

Use of the two bits to enable alignment checks provides a great deal of flexibility. The AM bit provides global operating system control, as it is located in register CR0 that is global to all tasks, and can only be referenced by the operating system. It will typically be set when the operating system is initialized, provided that the operating system includes the appropriate interrupt handler (e.g., bit 17 of CR0).

The AC bit provides application level control. It is in the EFLAGS register that is swapped at a task switch and is accessible by an application executing at level 3. Since EFLAGS is swapped on a task switch it is as if each task has a private copy of EFLAGS and, hence, its own copy of the alignment checker. Typically, AI programs need to have alignment checking only at level 3, the applications level. By having access to the two mask bits, the programmer has two opportunities to select whether or not an alignment check is done; one at the applications level (EFLAGS register can be cleared or set by the program), and one at the operating system level (AM bit cleared or set). It should be understood that both bits mask at all levels. However, AC is implicitly masked at all levels except level 3 while the AM bit can only be set/reset (i.e., controlled) at level 0.

The implementation of the invented alignment checker centers around the recognition of misaligned data accesses. This is performed using the lower three bits of the 32-bit linear address bus 20 (see FIG. 4) and the length of the bus cycle as ordered by instruction decode unit 15 or the control unit 19. Misaligned data reference faults are generated within segmentation unit 14, which also generates linear addresses. The fault is serviced by control unit 19.

The following table defines a misaligned data access for bus cycles of different lengths in terms of the values of the lower three bits of LA bus 20. Bus cycle lengths are determined by decoding the "bus-request type" field from the instruction decode unit 15 or control unit 19.

TABLE 2

| Bus Cycle Length (in bytes) | LA Bus (bits 2, 1, 0) | Comments |
| --- | --- | --- |
| 1 | xxx | No misaligned access possible. |
| 2 | xx1 | Access to odd address is misaligned. |
| 4 | xx1 | Access to an address crossing 4-byte boundary is misaligned. |
|  | x1x |  |
| 8 | xx1 | Access to an address crossing 8-byte boundary is misaligned. |
|  | x1x |  |
|  | 1xx |  |
| 4ND | xx1 | This is a 4-byte-not-done bus cycle. |
|  | x1x | It implies that another 4-byte cycle is |
|  | 1xx | coming up and is therefore treated like an 8-byte cycle. |

Once it is determined that a misaligned access has occurred, it is a relatively simple matter to determine the other conditions necessary to generate a fault. With reference to FIG. 5, a diagram of the alignment checking logic circuitry is shown. Logic gates 40–44 and latches 41 and 45 are used to decode signals received from segmentation unit 14 to insure that unit 14 is driving bus 20 and that the bus cycle will not be aborted. The three lowest-order bits of LA bus 20 appear on lines 51-53. These signals are combined with bus-request-type field signals from either unit 15 or unit 19 at the inputs of gates 46 and 69. Altogether, gates 46, 48, 49, and 67-72 combine to produce a set of signals which indicate the byte-length of the misaligned reference in accordance with Table 2. For example, gate 46 produces a signal on line 80 which signifies a 2-byte misaligned reference; gate 67 produces a signal on line 81 signifying a 4-byte misaligned reference: gate 71 produces a signal on line 82 which signifies an 8-byte misaligned reference; and gate 49 produces a signal on line 83 which signifies a 4ND misaligned reference. Each of the signals 80–83 are ORed by gate 47, with the result being stored in latch 50. (The symbols P1 and P2 associated with the latches of FIG. 5 designate the phase in which each is clocked. For instance, latches 41 and 59 are clocked in phase 2 of the system clock, whereas latches 45, 50 and 62 are clocked in phase 1 of the next clock pulse).

The AM and AC bits appearing on lines 54 and 55 are input to AND gate 57. Both must be "1" to generate a misaligned fault. The output of gate 57 is ANDed at gate 63 with the outputs of latches 45 and 50 along with the privilege level of the program provided on line 56. The privilege level in the currently preferred embodiment must be at level 3 as determined by CPL bits in control unit 19. Gates 58–62 also provide an input to AND gate 63 to insure that the bus cycle type is one in which AC violations are permitted. (AC violations are not allowed on certain cycles. For instance, they are not permitted on branch cycles since, by definition, it is a single byte cycle.)

Gate 63's output is coupled to one input of AND gate 65. The other input to gate 65 is line 66 which provides a signal indicating that the microprocessor's pipeline is free before the fault signal is generated. Altogether, in addition to ANDing the AC and AM bits, the logic of FIG. 5 is designed to insure that no access to any of the system segments is being made and that a legitimate bus-cycle is being performed. AND gate 65 produces a signal called SINTR (segmentation unit interrupt) on line 67, which is coupled to control unit 19, whenever all of the above conditions are met.

On receiving SINTR, the control unit immediately halts all execution and takes steps to service this alignment check fault. It inserts two no operation (NOP) clocks and then forces the microcode to the entry-point for alignment check faults. From then on, the microcode takes over doing whatever is necessary to store the return address and inform the user program of the fault.

Thus, a microprocessor providing selectable alignment checking has been disclosed.

We claim:

1. A computer system comprising:
an operating system for controlling the operation of said computer system;
a processing unit for executing a program in accordance with a software protection mechanism, said protection mechanism comprising a plurality of privilege levels ranging from a most-privileged level to a least-privileged level, wherein said program is executed at a current privilege level identifying the precedence of said program within said computer system;
a memory means coupled to said processing unit for storing data;
a means for referencing data stored within said memory means at addresses specified by said program, said referencing means being controlled by said processing unit; and
a means for controlling the generation of an alignment fault if a memory reference specified by said program is to a misaligned address, said controlling means comprising first and second bits, said first bit being accessible at said least-privileged level and selectively providing for the generation of alignment faults, wherein said second bit is accessible only at said most-privileged level and provides global control over the generation of alignment faults.

2. The computer system according to claim 1 wherein said second bit masks said first bit such that alignment faults are generated only if both of said mode bits are set to a predetermined state.

3. The computer system of claim 1 wherein applications programs are assigned to said least-privileged level, and said operating system is accorded said highest-privileged level.

4. A microprocessor comprising:
a control unit for executing a program in accordance with a software protection mechanism comprising a hierarchy of privilege levels for granting selected access to objects, said hierarchy ranging from an operating system level to an applications level, said program being executed at a current privilege level which identifies the precedence of said program;
a memory coupled to said control unit for storing data;
means for referencing data stored within said memory at addresses specified by said program, said referencing means being coupled to said control unit;
a segmentation unit coupled to said control unit for translating segmented addresses into linear addresses and for storing system segments, said segmentation unit comprising a means for detecting misaligned data references; and
a means for controlling the generation of an alignment fault if a misaligned data reference is detected, said controlling means comprising first and second mode bits, said first mode bit being accessible at said applications level and selectively providing for the generation of alignment faults, wherein said second bit is accessible only at said operating system level and provides global control over the generation of alignment faults.

5. The microprocessor according to claim 4 wherein said second mode bit masks said first mode bit such that alignment faults are generated only if both of said mode bits are set to a predetermined state.

6. The microprocessor of claim 5 wherein said fault is generated only when no access is being made to the system segments within said segmentation unit.

7. The microprocessor according to claim 6 further comprising a paging unit coupled to said segmentation unit by a bus, said paging unit converting said linear addresses into physical addresses, and wherein bits of said bus identify a misaligned data access to said detecting means for bus cycles of different lengths.

8. A microprocessor device for executing instructions, said device having privilege levels 0-3 within which said instructions execute, and having a system for generating memory requests with alignment checking of said memory requests, said device comprising:
a flag register writable by an instruction executed at privilege level 3, said flag register including an alignment control bit for enabling generation of an alignment fault;
a control register writable by an instruction executed at privilege level 0, but not writable by an instruction executed at privilege level 3, said control register including a masking bit; and
logic circuitry coupled to receive the contents of both said flag register and said control register, wherein said logic circuitry generates an enable signal only if both said alignment control bit and said masking bit are set, said enable signal being coupled to said system for generating memory requests such that said system generates an alignment fault if a misaligned memory request occurs and said enable signal is present.

9. The microprocessor device according to claim 8 wherein said alignment control and masking bits are set when their value is 1.

10. The microprocessor device according to claim 8 in combination with a bus external to said device and a memory receiving said memory requests via said bus.

* * * * *

UNITED STATES PATENT AND TRADEMARK OFFICE
CERTIFICATE OF CORRECTION

PATENT NO. : 5,201,043
DATED : 4/6/93
INVENTOR(S) : JOHN H. CRAWFORD AND ASHISH B. DIXIT

It is certified that error appears in the above-indentified patent and that said Letters Patent is hereby corrected as shown below:

Col. 1, Line 22 Delete "if" Insert --is--

Col.1, Line 44, Delete the second occurance of "is" Insert --If--

Col. 1, Line 56, Delete "dwor-" Insert --dword--

Col. 1, Line 56, Delete "d"

Signed and Sealed this

Third Day of May, 1994

Attest:

BRUCE LEHMAN

Attesting Officer

Commissioner of Patents and Trademarks